INVENTOR
Dieter Straub

BY Spencer & Kaye
ATTORNEYS

INVENTOR
Dieter Straub
BY Spencer & Kaye
ATTORNEYS 3,502,900
SIGNAL CONTROL CIRCUIT
Dieter Straub, Constance, Germany, assignor to Telefunken Patentverwertungsgesellschaft m.b.H., Ulm (Danube), Germany
Filed Dec. 6, 1968, Ser. No. 781,771
Claims priority, application Germany, Dec. 6, 1967, 1,537,515
Int. Cl. H03k *19/08*
U.S. Cl. 307—203 4 Claims

ABSTRACT OF THE DISCLOSURE

A logic circuit in which a signal of a first voltage value serves as an input to one side of the circuit, and a signal of a different voltage value serves as an input to the other side of the circuit. There are means for supplying a signal of the second voltage value to the first side of the circuit, and means for supplying a signal of the second voltage value to the second side of the circuit whereby the logic capability of the circuit can be expanded to include the logical alternatives of the functions of the unimproved circuit.

Cross-references to related applications

This application constitutes an improvement on the logic circuit disclosed in the copending United States application of Herbert Stopper, Ser. No. 650,300, filed June 27, 1967, and now German Patent No. 1,246,027, of common ownership with this application.

Background of the invention

This invention relates to logic circuits, and more particularly to a logic circuit in which the logic capability may be expanded by reversing the actions of conjunction and disjunction.

The German Patent No. 1,246,027 discloses a logic circuit consisting of two emitter-coupled transistors which circuit has a high logic capability in spite of little circuitry involved. This circuit is shown in FIGURE 1. It consists of two transistors T1 and T2, which are connected to ground at their collectors via identical resistors and whose emitters are connected in parallel and are also connected to ground via a constant current source V1. The constant current source V1 furnishes a current I which is distributed to the two transistors depending on the manner of control employed for the latter. Both transistors are controlled by logic signals A and B respectively corresponding control voltages $U_A$ and $U_B$ in such a way that, except for the switching process, either transistor T1 or T2 is conductive whereas the other is blocked. Whereas the voltage $U_A$ of the logic signal A is applied directly to the base of transistor T2, the voltage $U_B$ of the logic signal B is reduced by an amount U1 and then applied to the base of transistor T1. U1 corresponds to half the signal rise between the voltage for logic ONE and the voltage for logic ZERO. The reduction of the control voltage $U_B$ by the value $U_1$ is effected by the series connection of a resistor R2 and a constant current source V2 which furnishes a current U1/R2.

Emitter followers are connected to the input points A and B: At input point A there are two transistors T41 and T42 with the input signals A1 and A2, which both act on a resistor R3; at input point B there are two further transistors T51 and T52 which have the common emitter resistance consisting of the series connection of the resistor R2 and the constant current source V2.

The entire circuit is so dimensioned that its output signals Q and $\overline{Q}$ are suitable to control all inputs of an identical circuit.

The circuit described thus far (German Patent No. 1,246,027) and United States application Ser. No. 650,300 furnishes the following relationships:

$$Q=A1+A2+\overline{B1}\cdot\overline{B2}$$
$$\overline{Q}=\overline{A1}\cdot\overline{A2}\cdot(B1+B2)$$

Multiplication symbols here indicate conjunctive functions and plus signs disjunctive functions.

FIGURE 2 shows the equivalent logic circuit diagram of the circuit according to FIGURE 1.

Summary of the invention

Among the objects of the present invention are an increase in the logic capability of a logic circuit.

A further object is to permit the operations of conjunction and disjunction to be reversed under certain circumstances.

A further object is to provide a circuit which is well suited for complex switching systems since the logic variables to be processed could then be linked in different ways by the same circuit.

A further object is to provide a circuit which may be used as the basic element of a larger circuit system.

Briefly stated, these and other objects of the invention are achieved by providing for the logic circuit disclosed in the aforementioned German patent voltage source connected in series with the control circuit of the second transistor which is identical to that provided for the first transistor. Means are also provided to switch both voltage sources between a first and a second predetermined voltage value of equal polarity in dependence on the type of control employed therefore and which switch the first voltage source to the first or second voltage value, respectively and which switch the second voltage source to the second or first voltage value, respectively.

Description of the preferred embodiments

Figure 1:
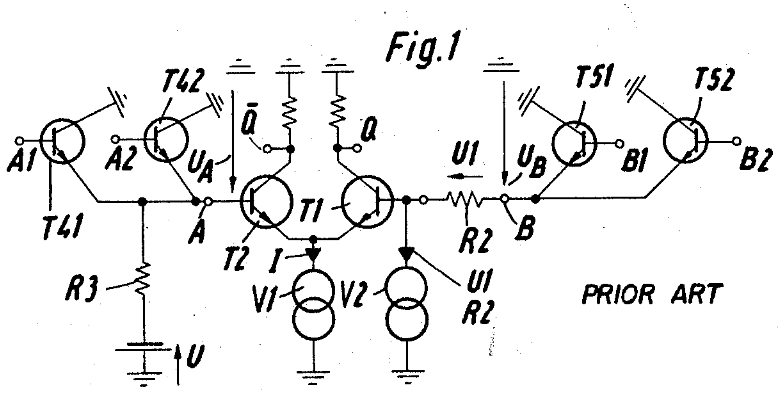
Fig.1 PRIOR ART
FIGURE 1 is a schematic electrical diagram illustrating a logic circuit disclosed in German Patent No. 1,246,027.
Figure 3:
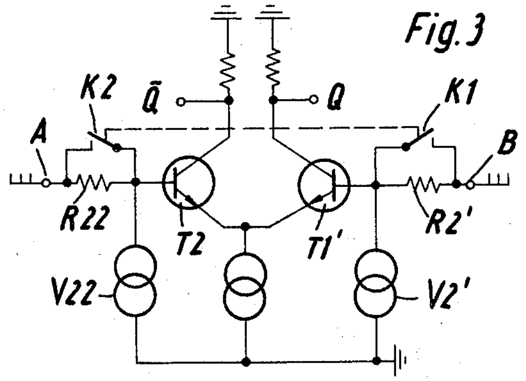
FIGURE 3 is a schematic electrical diagram illustrating one embodiment of the present invention.

FIGURE 3 shows the circuit of FIGURE 1 modified according to the present invention. Corresponding parts have corresponding reference numerals. For reasons of clarity transistors corresponding to the transistors T41, T42, T51 and T52 of FIGURE 1 are not shown although these in fact are used. The resistor R3 shown in FIGURE 1 and the voltage source U, which are both connected in series between the emitters of transistors T41 and T42 and ground in FIGURE 1, are not necessary in the circuit according to FIGURE 3. Since an alternate power supply, hereafter described, is used for this side of the circuit. The circuit according to FIGURE 3 is different from that of FIGURE 1 in that input A does not lead directly to the base of transistor T2, as it does in FIGURE 1, but does so via a resistor R22. Between the mentioned base and ground there is a current source V22. The resistor R2′ leading from input B′ to the base of transistor T1′ is identical with the resistor R2 of FIGURE 1 and the current source V2′ is identical with the current source V2 of FIGURE 1. Resistors R2′ and R22 correspond in all their values and so do current sources V2′ and V22. The circuit according to FIGURE 3 is thus symmetrically constructed. Above resistor R2′ there is a switch K1 and above resistor R22 there is a switch K2. Both switches can be alternately switched, i.e. when the one switch is closed, the other is open and vice versa. They can be formed by any electronic switching elements, which exhibit very low residual potential and are suited for floating control.

In order to describe the function of the circuit, it shall be assumed that switch K1 is open and switch K2 is closed. The function of resistor R22 is thus eliminated and current source V22 takes over the function of resistor R3 and of voltage source U of FIGURE 1. The circuit is thus identical in its function with that of FIGURE 1. It is again $$Q=A+\overline{B}$$

$$\overline{Q}=\overline{A}\cdot B$$

where $$A=A1+A2+\ldots+A_m$$

$$B=B1+B2+\ldots+B_n$$

(As already mentioned, the transistors to form inputs A and B are not shown in FIGURE 3).

Since the circuit is symmetrical, its function for the opposite switching state, i.e. switch K1 closed and switch K2 open, is immediatedly evident. The change of the switches from one switching state to another corresponds to an exchange of input variables A and B and output variable Q and $\overline{Q}$ while maintaining the first switching state. The logic result for the contemplated switching state thus results from that for the first swiching posiion by mutual exchange of A and B as well as Q and $\overline{Q}$:

$$Q=A\cdot\overline{B}$$

$$Q=\overline{A}+B$$

To describe the state of both switches K1 and K2 the logic condition $k$ is introduced. The following may then apply:

| Switch K1 | Switch K2 | k |
|---|---|---|
| Open | Closed | 1 |
| Closed | Open | 0 |

With this definition it results that $$Q=(A+\overline{B})\cdot k+A\cdot\overline{B}\cdot\overline{k}$$

$$\overline{Q}=\overline{A}\cdot B\cdot k+(\overline{A}+B)\cdot\overline{k}$$

Figure 2:
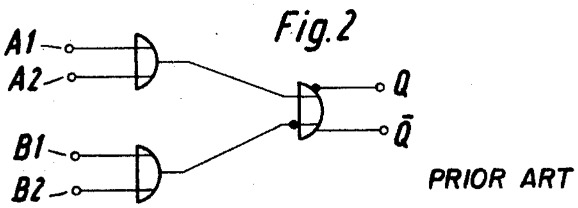
Fig.2 PRIOR ART
FIGURE 2 is a logic diagram illustrating the function of the electrical circuit of FIGURE 1.
Figure 4:
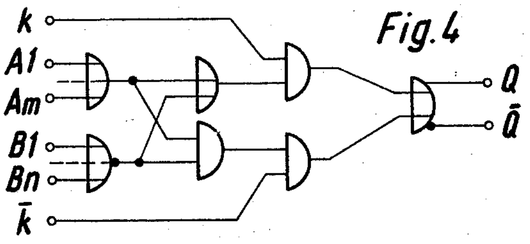
FIGURE 4 is a logic diagram illustrating the logic function of the electrical circuit of FIGURE 3.

The equivalent logic circuit diagram for the circuit of FIGURE 3 is shown in FIGURE 4. A comparison with FIGURE 2 indicates that the logic capability of the circuit according to FIGURE 1 has been considerably increased by the slight technical circuit expansions according to FIGURE 3.

Figure 5:
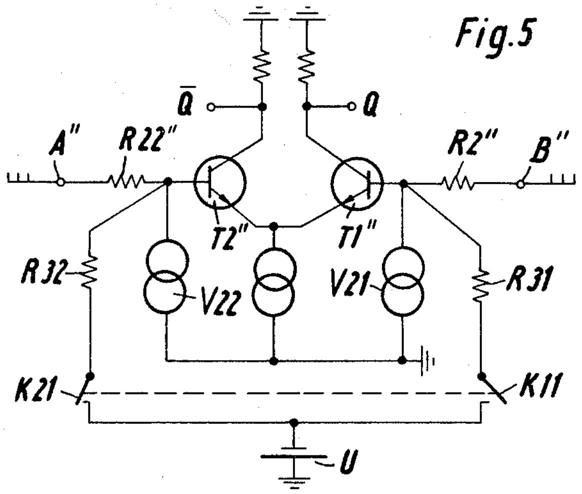
FIGURE 5 is a schematic electrical diagram illustrating another embodiment of the invention.

FIGURE 5 shows another embodiment of the invention. The voltage may be selectively lowered at the base of the one or the other transistor by a certain amount with respect to ground. Compared with the circuit of FIGURE 3, switches K1 and K2 above resistors R2″ and R22″ are here eliminated. A series connection of a resistor R31 and a switch K11 leads from the base of transistor T1″ to the voltage source U; correspondingly the series connection of a resistor R32 and a switch K21 leads from the base of transistor T2″ to the same voltage source. As in the case of the switches K1 and K2 of FIGURE 3, the two switches K11 and K21 are alternately switched.

To explain the function of the circuit it is first assumed that both switches are open. Then a current I flows to ground from point B″ via resistor R21 and the current source V21. The base of the transistor T1″ is thus always more negative than point B by $I\cdot R21$. Correspondingly, the same applies for the base of transistor T2″ with reference to point A. Since the same voltages are applied to both resistors R21 and R22, these voltages do not affect the logic function of the circuit consisting of transistors T1″ and T2″ and operating as a differential amplifier. To realize the desired function, the potential base-ground of the one or the other transistor, respectively, must again be reduced by a predetermined amount with respect to the other or the one transistor, respectively. This is accomplished in a simple manner by increasing the current through the applicable resistor R2″ or R22″. To reduce, for example, the potential base-ground at transistor T1″ by this amount, switch K11 is closed. Thus the current through resistor R2″ is increased by the amount ΔI, which results in an increased voltage drop across the resistor of $$\Delta U=\Delta I\cdot R2''$$

Correspondingly this applies for reducing the potential base-ground of transistor T2″.

The resistors R31 and R32 are so dimensioned that ΔU again corresponds to half the signal rise between the voltage logic ONE and the voltage logic ZERO. With such dimensions the logic function of the circuit according to FIGURE 5 corresponds to that of FIGURE 3.

Figure 6:
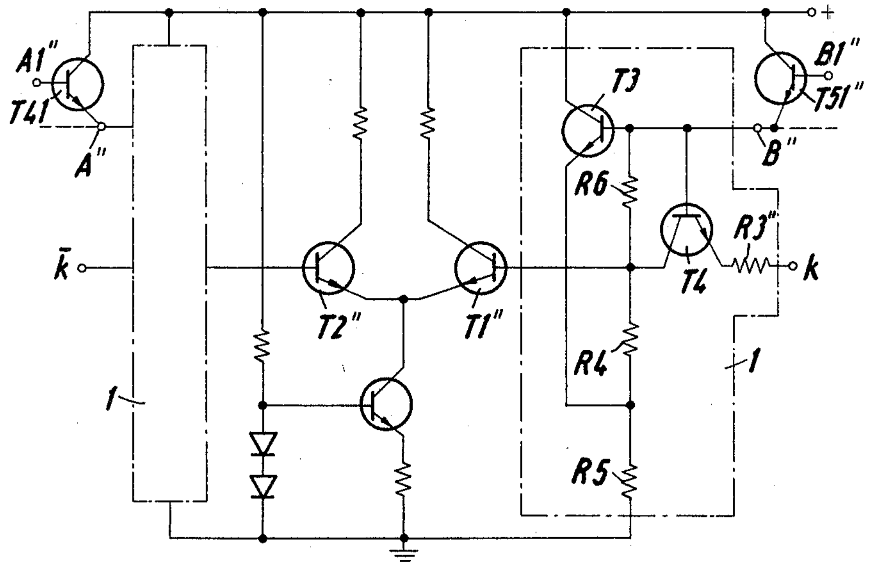
FIGURE 6 is a more detailed electrical diagram illustrating the invention of FIGURE 5.

The advantage of the circuit according to FIGURE 5 is particularly that electronic switching elements can be used for switches K11 and K21 whose residual potential is not negligibly low. A preferred embodiment of this circuit with such electronic switching elements is shown in FIGURE 6.

Since the circuit is fully symmetrical (see FIGURE 5), the following discussion is limited to the control of transistor T1″. The voltage source V21 is formed by a transistor T3 and resistors R4, R5 and R6. The collector of transistor T3 is applied to the positive supply voltage and its emitter to ground via resistor R5. Between its base and its emitter there is the series connection of resistors R6 and R4. The connection point between these two resistors leads to the base of transistor T1″. The base of transistor T3 is also connected to point B″. To clarify the function, transistor T51″ whose base accepts the input variable B1″ is shown at point B″. The effect of transistor T3 in connection with resistors R6, R4, R5 as a constant current source is that a voltage is present on its base-emitter path which is very little dependent on the emitter current so that an almost constant current flows through resistors R4 and R6 which is little dependent on the voltage applied to point B″. Current fluctuations through these resistors which would be caused by variations in the voltage fluctuations at point B″ without control are thus substantially compensated by the feedback connection of the transistor over resistor R5. Resistor R6 corresponds to resistor R2″ of FIGURE 5. Its resistance is equal to that of R4. Then the base of transistor T1″ is principally always more negative with respect to point B″ by a voltage which corresponds to half the voltage drop at the conductive base-emitter diode of transistor T3.

For varied reasons the difference between the voltages logic ZERO and logic ONE should be equal to the base-emitter voltage of the transistors employed. If now, based on the above-described conditions, the voltage base-ground of transistor T1″ is to be reduced by half this voltage value, a correspondingly increased current must be sent through resistor R6. This occurs analogously with FIGURE 5 by means of a transistor T4 and a resistor R3″. The collector of transistor T4 is applied to the base of transistor T1, its base is applied to the base of transistor T3 and its emitter leads to the input $k$ via resistor R3″. For $k=1$ the potential between this input and ground must be high enough that the required current flow is achieved through transistor T4, whereas the potential $k=0$ between the same points must block the same transistor. A first possibility is to connect the above-mentioned input to ground at $k=1$ and to the positive supply voltage at $k=0$.

To be able to also use the voltage levels accepted for other logic variables, a transistor emitter circuit can be placed in front of resistor R3 at point $k$ whose collector is applied to the above-mentioned resistor. This transistor circuit can be controlled with normal signals of logic variables and at its collector there is then, depending on the type of control employed, either ground or a positive potential.

The transistor T4 of FIG. 6 in conductive and non-conductive state corresponds to the switch K11 of FIG. 5 in conductive and non-conductive state, respectively. The resistor R31 of FIG. 5 has no equivalent in the circuit of FIG. 6; the resistor R3'' of FIG. 6, however, serves a like function as resistor R31, since the collector current of the transistor T4 depends on the value of the resistor R3''.

It will be understood that the above description of the present invention is susceptible to various modifications, changes and adaptations.

I claim:

1. In a logic circuit controlled by signals of different voltage values comprising two sub-circuits connected in a side by side arrangement and including a first voltage source for supplying a signal of one voltage to one of the sub-circuits, the improvement comprising a second voltage source identical to that for the first circuit connected in series with the control circuit of the other circuit; means for switching both voltage sources between a first and second predetermined voltage value each of equal polarity; and switching means for switching the one voltage source to the first or the second voltage value, respectively, and the second voltage source to the second or first voltage value, respectively, in dependence on the type of control employed.

2. In a logic circuit as defined in claim 1 in which the said two sub-circuits each include a transistor and in which the said two transistors are connected to each other in a current receiving arrangement with their emitters connected by a constant current source with one pole of a voltage supply source and with their collector resistors connected with the other pole of supply source, said first voltage source being disposed in series with the control circuit of one transistor, the improvement further comprising said second voltage source being connected with the control circuit of the other transistor.

3. In a logic circuit as defined in claim 2 whose voltage sources are each formed by a resistor disposed in series in the control circuit, and including means for feeding a constant current into the said resistor, the improvement further comprising means for setting the second voltage value at zero and switch means bridging the resistor of each voltage source.

4. In a logic circuit as defined in claim 2 whose voltage sources are each formed by a resistor disposed in series in the control circuit, and means for supplying a constant current into the resistor, the improvement further comprising means for supplying the second voltage value at an amount which is higher by the amount of half a control signal voltage swing than the first voltage value, a current source disposed on the side of each transistor, means for switching each said current source to cause an additional current to flow therethrough of such an amount that the voltage produced thereat is equal to the second voltage value.

References Cited

UNITED STATES PATENTS

| | | | |
|---|---|---|---|
| 3,140,405 | 7/1964 | Kolling | 307—203 X |
| 3,329,835 | 7/1967 | D'Agostino | 307—215 |
| 3,417,261 | 12/1968 | Walsh | 307—218 X |

DONALD D. FORRER, Primary Examiner

U.S. Cl. X.R.

307—207, 217, 218